Dec. 5, 1950   J. S. RHYNE ET AL   2,532,334
GYROSTABILIZER
Filed July 15, 1947   4 Sheets-Sheet 1
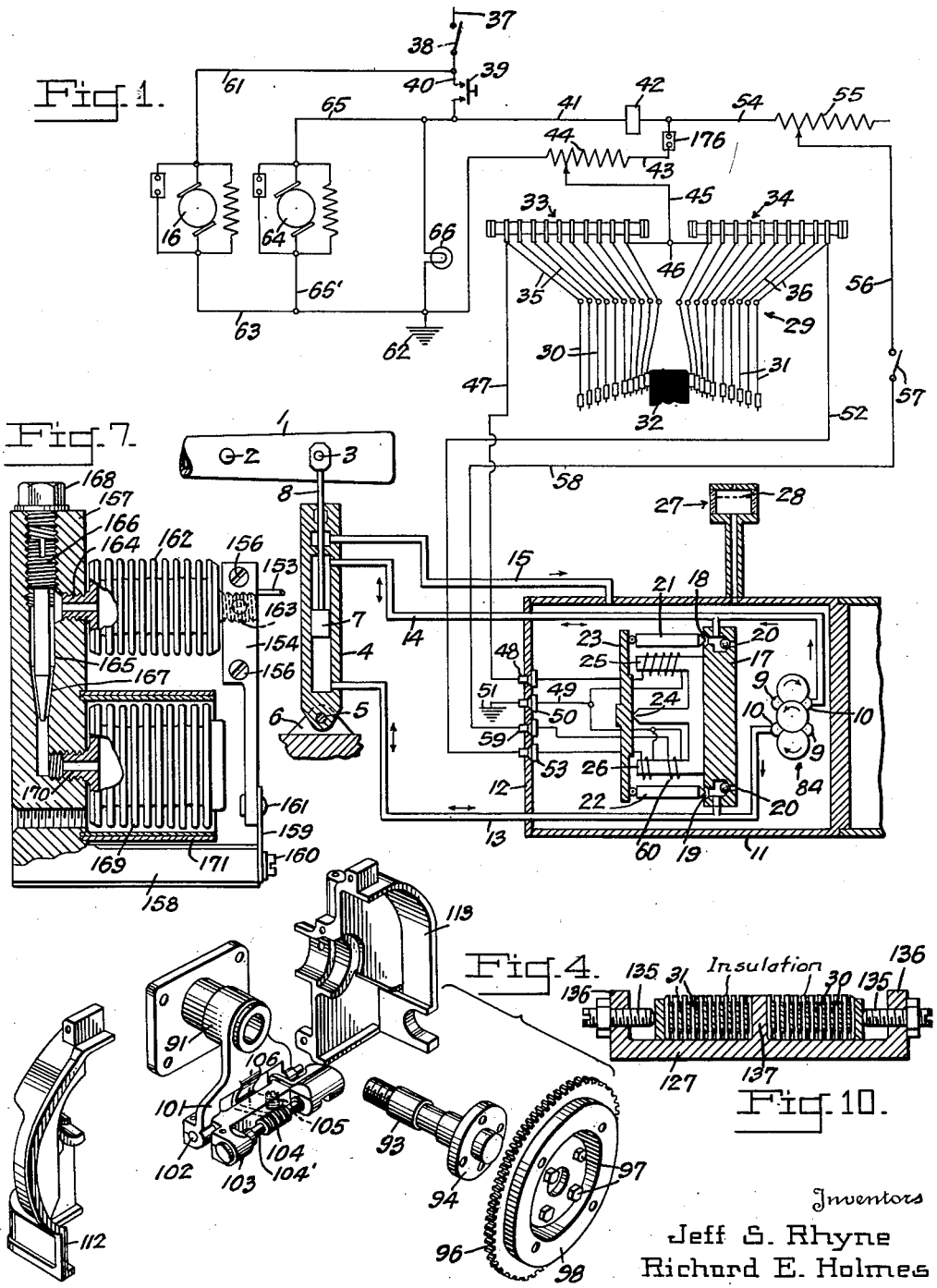
Inventors
Jeff S. Rhyne
Richard E. Holmes
By J. H. Church & H. E. Thibodeau
Attorneys

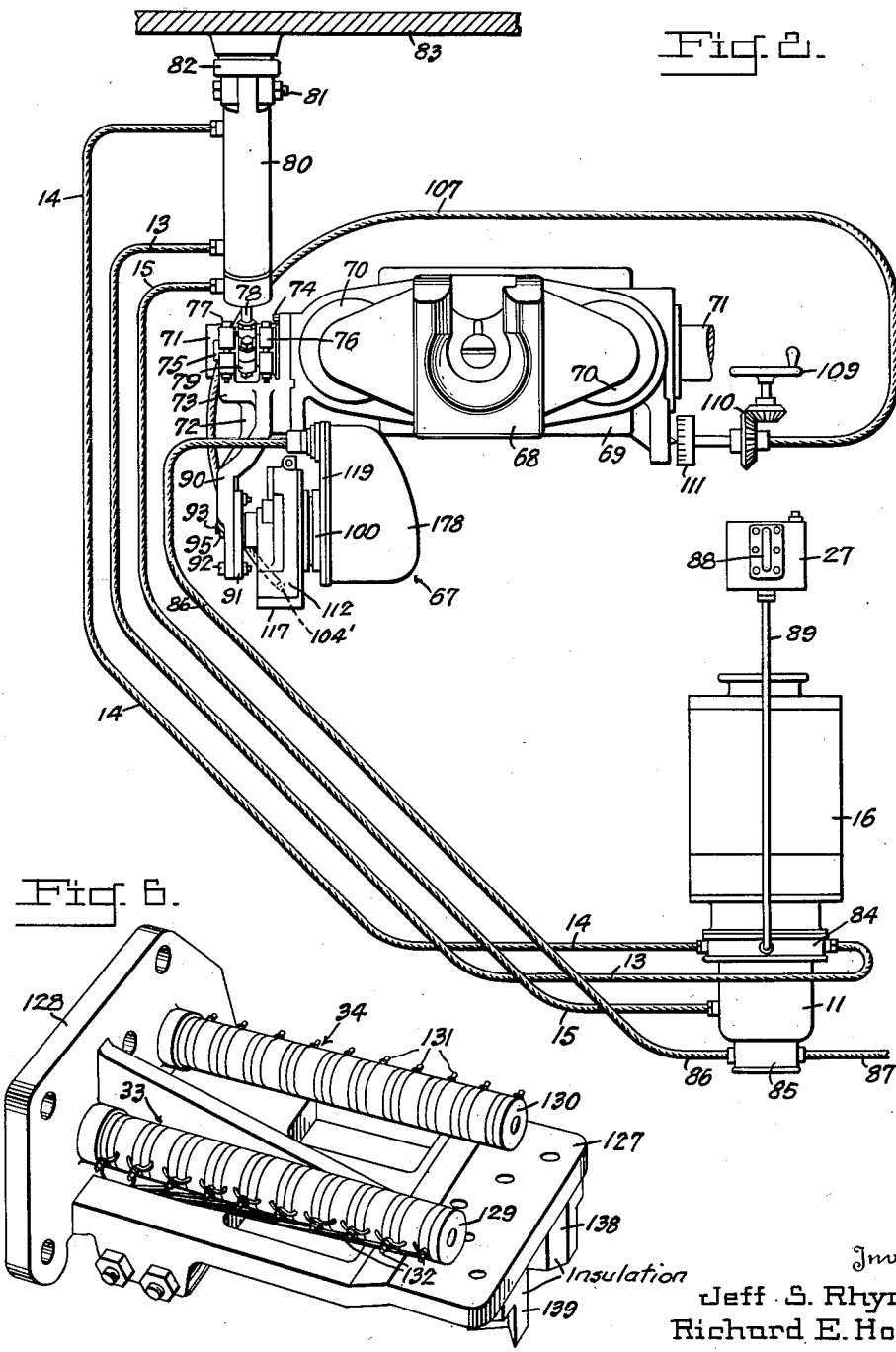

Dec. 5, 1950      J. S. RHYNE ET AL      2,532,334
GYROSTABILIZER
Filed July 15, 1947      4 Sheets-Sheet 3
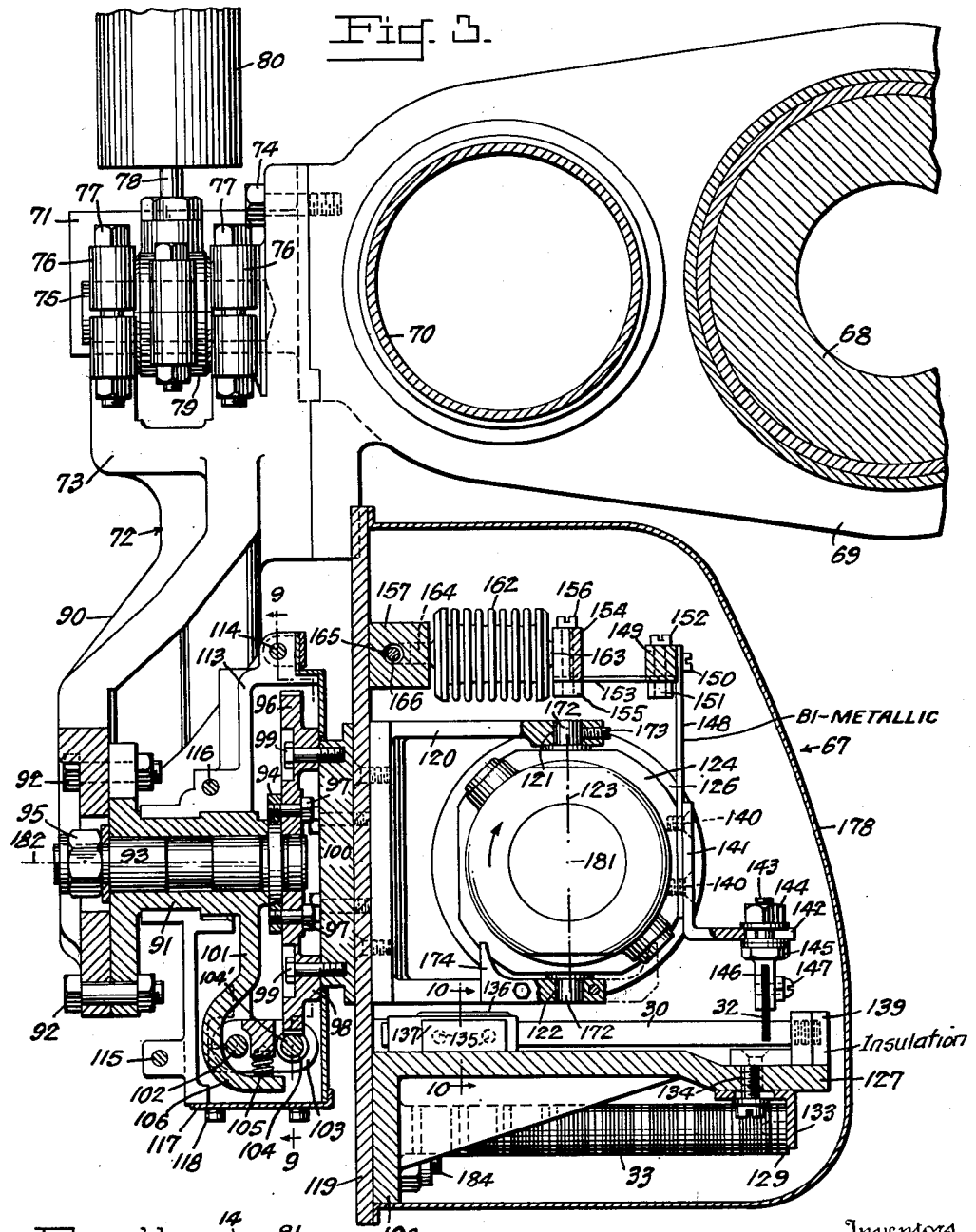
Inventors
Jeff S. Rhyne
Richard E. Holmes Dec. 5, 1950
J. S. RHYNE ET AL
2,532,334
GYROSTABILIZER
Filed July 15, 1947
4 Sheets-Sheet 4
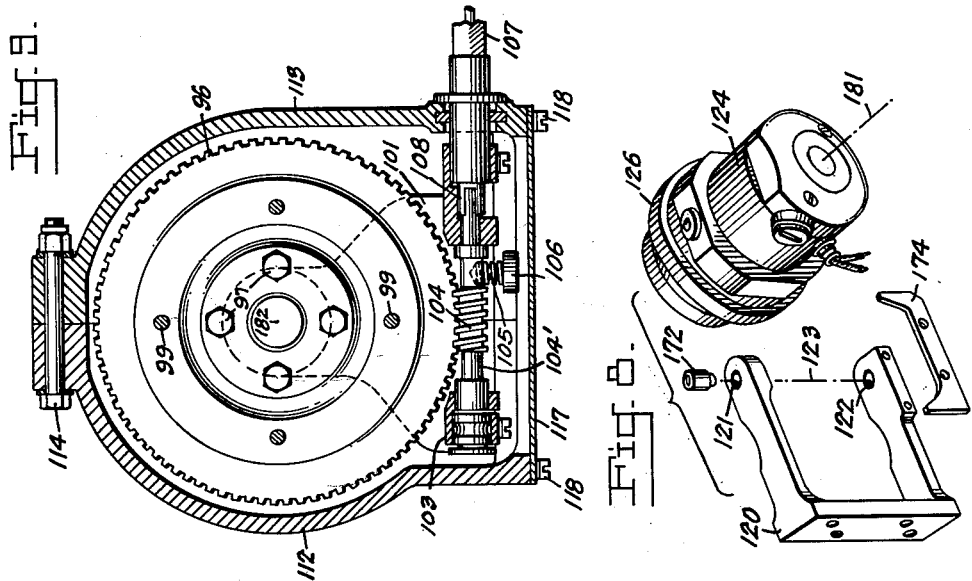
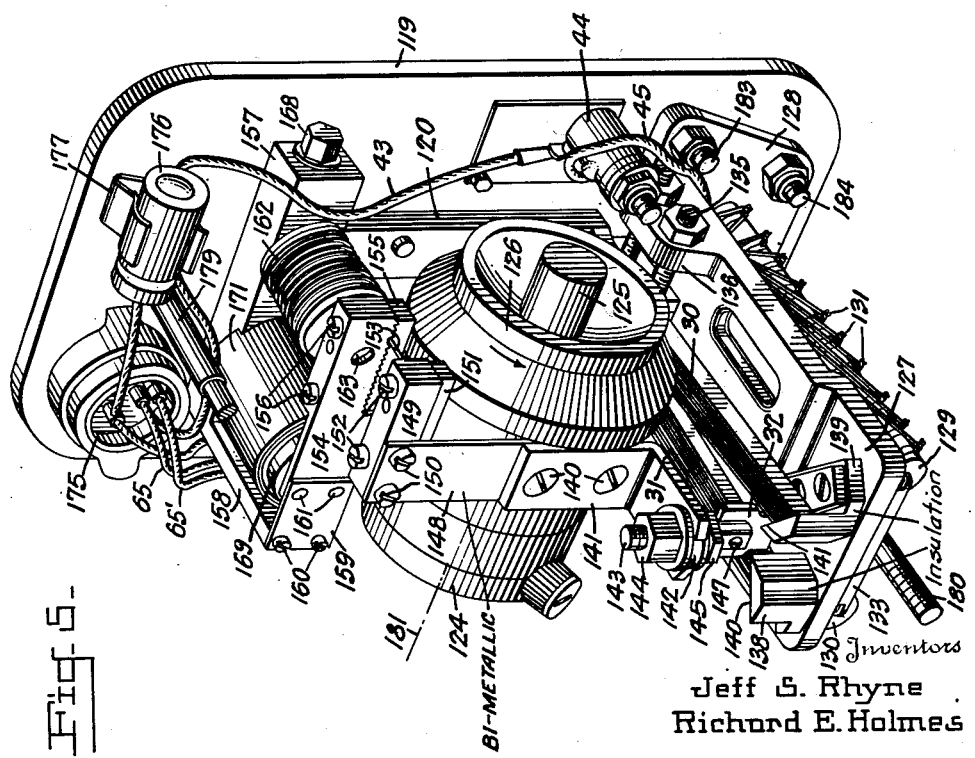
Inventors
Jeff S. Rhyne
Richard E. Holmes
By J. H. Church & H. E. Thibodeau
Attorneys Patented Dec. 5, 1950

2,532,334

UNITED STATES PATENT OFFICE 2,532,334

GYROSTABILIZER

Jeff Smith Rhyne, Marianna, Fla., and Richard E. Holmes, Milton, Mass.

Application July 15, 1947, Serial No. 761,126

5 Claims. (Cl. 89—41)

(Granted under the act of March 3, 1883, as amended April 30, 1928; 370 O. G. 757)

The invention described herein may be manufactured and used by or for the Government for Governmental purposes, without the payment to me of any royalty thereon.

This invention relates to gyroscopic instruments intended for use in stabilizing guns.

It is an object of the invention to provide an instrument in which the precession of a rate responsive gyroscope in response to movements of an unstable platform upon which a gun is mounted, initiates and controls the application to the gun of forces causing the gun to remain in substantially fixed position relatively to space external of said platform.

Another object is to provide a gyroscopic instrument controlling a gun mounted for elevation on, and with respect to, an unstable platform, in such a manner that the gun is moved in elevation relatively to said platform through angles substantially equal to the time integral of the rate of angular movement of the platform about the elevation axis of the gun, and in the direction opposite to that of said platform, whereby the gun is maintained at a pre-selected elevation angle relatively to space external of the platform.

A further object is to provide a two-degree-of-freedom gyroscope, so mounted upon a gun, elevatable on an unstable platform, that wandering of the gun from a predetermined and pre-set angle of elevation is automatically corrected.

A further object of the invention is to provide a combination of a gun, mounted upon an unstable platform, and elevatable with respect thereto, and a two-degree of freedom gyroscope, such that the gyroscope's mutually-normal spin and precession axes are both normally parallel to a plane perpendicular to the axis of gun elevation.

A still further object is to provide a combination as in the immediately preceding paragraph wherein the gyroscope is elevatable as a unit with the gun while being adjustable relatively thereto about an axis parallel to the axis of gun elevation with said spin and precession axis maintained parallel to said plane.

Another object is to provide a gyroscopic instrument of the two-degree-of-freedom type, as aforesaid, that has its spin axis horizontal when the gun which it controls, is elevated to the desired angle with reference to a true horizontal plane, and that has an unbalanced weight offset from the common vertical plane of the spin and precession axes of the gyroscope, so that a component torque is applied about the precession axis when, and only when, the precession axis becomes tilted.

A further object is to provide a gyroscope as in the preceding paragraph, wherein the resulting pivotal movement of the gyroscope about its precession axis, due to the component torque about said axis, when the gyroscope and gun depart as a unit from the desired angle of gun elevation, is so related with the direction of spin of the gyroscope and the control for the gun elevation servo-motor, as to substantially and automatically return the gun to the desired angle of elevation.

Other objects and advantages of our invention will become apparent as the description advances.

In the drawings:

Figure 1 is a diagrammatic view showing the principles of operation of a hydraulic gun-elevating mechanism under the control of precessional movement of the gyroscope.

Figure 2 is a view showing the breech end of a cannon, the power cylinder for stabilizing the same in elevation, the gyro control box, the manual means for adjusting the control box to effect a change in gun elevation, and the pump and motor unit for supplying pressure fluid to the power cylinder.

Figure 3 is a vertical sectional of the breech portion of the gun and showing one manner of mounting of a gyroscope and its associated gear box, together with a portion of the elevating piston, piston rod, and the latter's connection to the gun.

Figure 4 is an exploded view showing the details of the gear box or means for manually effecting precession of the gyroscope to change the angle of gun elevation.

Figure 5 is a perspective view of the gyroscope control with cover removed to show the gyroscope mounting, constraining and damping bellows, silverstat leaves, and connections between the gyroscope and the other parts mentioned.

Figure 6 is an inverted detail perspective view of the lower side of the silverstat mounting and particularly showing the two variable resistor coils and the electrical connections thereto.

Figure 7 is a sectional view through the damping bellows showing the means for varying the effective area of the passageway between the two, as well as the constraining spring and arm assembly.

Figure 8 is an exploded view of the gyroscope, mounting bracket, and stop plate.

Figure 9 is a sectional view showing the worm and gear arrangement for varying the angular relation between the gun bore and the spin axis of the gyroscope, and taken upon the line 9—9, Figure 3.

Figure 10 is a section taken on the line 10—10, Figure 3 and showing the manner of clamping the two sets of "silverstat" leaves in position.

Figure 11 is a schematic side elevation, to a reduced scale, showing the connection between the driving motor and the gun cradle and their spaced or offset relation with respect to the gun trunnion.

*General description of stabilizing system*

Referring in detail to the drawings wherein like numerals uniformly identify corresponding parts throughout, 1 (Fig. 1) indicates a portion of a gun adapted for elevation about trunnions, one of which is shown at 2 and journaled in bearings, not shown. A gudgeon 3 is attached to the gun near the breech thereof to define an axis parallel to the trunnion axis. A hydraulic power cylinder 4 has one end pivoted at 5 to a bearing 6 carried by a fixed part of the turret. This turret may be mounted upon a land vehicle such as a tank, or upon the deck of a ship. A piston 7 fits within cylinder 4 and has a rod 8 pivoted at its upper end upon gudgeon 3.

An oil pump adapted to be driven by a motor 16 is indicated generally at 84 and is shown as a simple gear pump having suction orifices 9 and pressure or discharge orifices 10. The oil pump motor is shown in Figure 1 as separated from the pump for greater clarity of illustration. The pump is enclosed within a casing 11 having a cover 12. A pressure line 13 extends from one discharge orifice 10, through cover 12, to cylinder 4 and is so connected that when pressure in this line predominates, the gun is depressed. A second pressure line 14 extends from the other discharge orifice 10, to cylinder 4 and is so connected with said cylinder that when pressure in this line predominates, the gun is elevated. A third line 15 is provided to return any oil that may seep past the packing gland of the cylinder 4. Thus the chambers in cylinder 4 above and below piston 7, are continuously under pressure and movement of the piston and gun may be effected by differentially varying the pressures in the two chambers.

A valve plate 17 is fixedly positioned within the casing 11 and has an upper valve orifice 18 in communication with pressure line 14, and a lower valve orifice 19 in communication with pressure line 13. Each orifice chamber is provided with a ball relief valve 20 to afford ease of operation when the gun is being elevated and depressed manually.

The effective sizes of orifices 18 and 19 are adapted to be differentially varied by valve pins 21 and 22, each mounted for reciprocation toward and from a respective orifice 18 and 19. The end of each pin adjacent its orifice is shaped to effectively seal the same when brought into contact therewith. Each pin is pivotally attached to a magnet or armature bar 23, fulcrumed at 24 on a projection extending from plate 17. Electromagnets 25 and 26 are fixedly carried by plate 17, each adjacent a respective pin 21 and 22 and adapted, when differentially energized to rock bar 23 in one direction or the other and thus retract one valve pin from its orifice while simultaneously moving the other pin toward its orifice. This rocking movement acts, then, in an obvious manner, to increase the hydraulic pressure in one line 13 or 14, and to simultaneously decrease the pressure in the other line. In the mid-position shown at Figure 1, the effective valve orifices are equal, the oil flow from each is substantially the same, and the pressures effective upon the two sides of the piston are equal. Hence no motion of the gun takes place. A liquid gage and filler, is indicated at 27 and is kept filled with liquid to the level indicated at 28.

Differential energization of the electromagnets 25 and 26 is effected under the control of a so-called "silverstat", indicated generally at 29. This "silverstat" consists of two sets, 30 and 31 of thin resilient metallic leaves with an insulating spacer 32 interposed between the two sets. The specific mounting of the "silverstat" will be described subsequently in connection with Figures 5 and 6. It is sufficient for the present, to explain that, in the absence of spacer 32, all leaves 30 and 31 are parallel, with their outer or contact ends slightly out of contact. When slight pressure is exerted on the contact end of the innermost of leaves of either set, the said ends are moved into contact to successively cut out resistances and thus increase the current flowing through a corresponding electromagnet. The leaves 30 and 31, are firmly clamped together at their inner ends, with insulating spacers therebetween.

Two identical sets of resistances 33 and 34 are used. Each set may conveniently consist of resistance wire wound upon a single core and connected in series. Adjacent ends of the sections of the wire are electrically connected to form leads to each of which a respective "silverstat" leaf is electrically connected by leads indicated generally at 35 and 36. The resistances of each set preferably are not uniform, but decrease in value from the inner or adjacent ends outwardly. Thus, in the model selected for illustration the consecutive windings of resistance set 33 may have ohmage values, from right to left, of 53.5, 16.3, 8.9, 5.6, 4.0, 3.0, 2.5, 2.1, and 1.7. The resistances of set 34 may have the same values reading from left to right, Figure 1.

The electrical circuit through the "silverstat" and pump coils may be traced as follows. From line 37, connected to a source of D. C. supply, the circuit passes through master switch 38, line 40, gyro switch 39, line 41, safety switch 42, capacitor 176, line 43, "stiffness" control rheostat 44, and line 45 to a common terminal 46, of silverstat resistance sets 33 and 34. The circuit here divides and one part proceeds through the innermost lead 35, the final one of the group of leaves having their ends in contact, and thence through the remaining unshorted resistances of set 33 to line 47. This line continues through an insulated plug 48 in cover 12, and thence to the coil of electromagnet 25. Return is by way of a common lead 49, through plug 50, to ground at 51.

From terminal 46, the other branch leads to the innermost "silverstat" leaf of set 31, the final leaf of those having their ends in contact at that time, thence through the unshorted resistances of set 34, to lead 52, through plug 53 to the coil of electromagnet 26. Return is made by way of lead 49 to ground 51 as in the case of electromagnet 25. The windings of electromagnets 25 and 26 are equal. In addition, electromagnet 26 has an auxiliary winding 60. This winding is energized by way of a lead 54 from switch 42, an adjustable rheostat 55, lead 56, switch 57, lead 58, and plug 59 to winding 60. Switch 57 is adapted to be closed only upon firing of the gun so that the momentary energization of winding 60 creates a temporary increase in pressure in line 13 and acts to counteract the "jump" or change in elevation that would otherwise be caused by the recoil.

From Figure 1, it will be noted that spacer 32, which is carried by the gyroscope in a manner subsequently explained, is of a size sufficient in normal or neutral position, to maintain an equal number of the inner "silverstat" leaves of each set in contact. This number is shown as five but may be varied depending upon the number of leaves used and the value of the resistances which each is adapted to short circuit. Pump motor 16, is supplied over a line 61 connected to line 40 intermediate switches 38 and 39. The circuit is completed through a ground connection at 62 over a line 63. The gyroscope motor 64 is supplied over a line 65 from switch 39, the circuit being completed by connection to ground at 62 over line 65'. A signal lamp 66 is connected to be illuminated whenever switches 38 and 39 are closed.

Relation of stabilizing gyro and gun

The gyroscope and gun are so related that they move angularly as a unit as the gun elevation changes about the axis of its trunnions. At the same time, the gyroscope is so connected with the gun that the angular relation between its spin axis and the bore axis of the gun, may be manually varied in accordance with the desired angle of gun elevation. While there are numerous ways of so relating the gun and gyroscope, in the model selected for illustration, the gyroscope unit, indicated generally by the numeral 67, (Figures 2 and 3) is pivoted upon a frame attached to the gun cradle.

Referring more particularly to Figures 2, 3, 4 and 5, 68 identifies the breech of a 75 mm. cannon mounted in a cradle 69 for recoil parallel to the bore axis, against resistance provided by a pair of recoil cylinders 70. Trunnions 71, one of which is shown at Figure 2, extend from cradle 69 and mount the gun for elevation in the usual manner. A bracket 72 is fixed by cap screws 74 to the left side of carriage 69, as seen in Figures 2 and 3. This bracket is provided with a yoke 73 formed to receive a bearing pin 75 parallel to the axis of trunnions 71. Clamping is effected by caps 76 secured in position on yoke 73 by through-bolts 77. A connecting rod 78, corresponding to rod 8, Figure 1, has a bearing 79 journaled upon pin 75 in a manner that will be understood from inspection of Figure 3.

The other end of rod 78 carries a piston, not shown, sliding within hydraulic power cylinder 80. This cylinder corresponds to cylinder 4, Figure 1, and, in Figure 2, is shown as pivoted at its upper end, by means of a pivot bolt 81, to a clevis 82 fixed to a wall portion 83 of a turret such as that of a tank or ship. The hydraulic operating parts are substantially as described in connection with Figure 1, so that it will be sufficient merely to identify, on Figure 2, hydraulic motor 16, gear pump 84, flexible pressure lines 13 and 14 from pump 84 to opposite ends of cylinder 80, oil return line 15, to valve casing 11, junction box 85 connected by cable 86 with gyro unit 67 and by cable 87 to a source of D. C. power supply. Also identified are oil reservoir 27, gage glass 88, and connecting pipe 89.

Bracket 72 which, as shown upon Figure 11, is offset from trunnion 71 in a direction rearwardly and parallel with the bore axis of the gun, has integrally formed therewith, a downwardly and rearwardly extending arm 90 (Figure 3) having a flanged sleeve 91 attached to its end, by means of bolts 92. A shaft 93 is journaled within sleeve 91 and is restrained from axial movement by a flange 94 secured to one end, and a nut 95 threaded upon the other end. A worm wheel 96 (Figures 2 and 9) is secured to the flange 94 concentric of shaft 93 by means of cap screws 97. This worm wheel has a circular flange 98 on one face to which is secured, by means of screws 99, a base 100. The gyroscopic unit 67 is secured to and carried by base 100, as will be subsequently described.

From Figures 3 and 4 it will be noted that sleeve 91 carries a downwardly-extending bracket 101 carrying a pivot pin 102 on which is pivoted a bearing frame 103. A worm 104 is journaled in bearings provided by frame 103 and the axis of pin 102 and of worm 104 are parallel. Worm 104 is urged upwardly into mesh with gear 96, by a spring 105 acting between an abutment 106 on bracket 101, and the under side of frame 103. The shaft 104' on which worm 104 is mounted, extends axially through one bearing of frame 103 and is there provided with a coupling 108, Figure 9, for the attachment of one end of a flexible drive shaft 107.

Means for driving shaft 107 are shown at Figure 2, in the form of a handwheel 109 and bevel gearing 110. A drum type indicator is shown at 111 as connected for rotation with gears 110, to indicate the angle of rotation of worm gear 96.

By the foregoing construction, when handwheel 109 is turned, worm 104 is rotated and, when in mesh with gear 96, acts to rotate the same and the gyro unit connected therewith. Frame 103 may be moved downwardly against the thrust of spring 105, by means not shown, to move worm 104 out of mesh with gear 96 when it is desired to effect rapid adjustment of the gyroscopic unit relatively to the gun.

From Figures 3, 4, and 9, it will be noted that a casing is provided for enclosing and protecting gear 96, worm 104, and associated parts. Such a casing comprises two halves 112 and 113 shaped to fit around the opposite sides of sleeve 91, gear 96, bracket 101, worm 104, and associated parts. The two halves are secured together in clamped relation about sleeve 91, by through-bolts 114, 115 and 116 (Figures 3 and 9). Enclosure of the casing is completed by a bottom plate 117, held in position by screws 118, Figure 9.

From the foregoing disclosure, it will be noted that the gyroscopic unit is connected with the gun for elevation as a unit therewith about the trunnion axes while, at the same time, being manually adjustable relatively to the gun about an axis that is parallel to said trunnion axis.

The gyroscopic unit

Base 100 has previously been identified as fixed to and rotatable with shaft 93 on operation of handwheel 109. A side plate 119 is fixed to base 100. A U-shaped bracket 120 is fixed to plate 119. The outer ends of the arms of this bracket are provided with aligned apertures 121 and 122, Figure 8, defining the precession axis of the gyroscope. Bracket 120 is so positioned that the axis 182 of shaft 93, and axis 123 are mutually normal and concurrent.

The sensitive element of the gyroscopic unit comprises a motor casing 124 containing the usual field coils, armature, commutator and brushes of a standard D. C., multi-pole motor intended to operate at speeds between 12,500 and 16,000 R. P. M. Anti-friction bearings, not shown, are mounted in cavities at opposite sides of casing 124, concentric of axis 123, and are engaged by pins 172 fixed in apertures 121 and 122 by set screws such as 173, Figure 3. A stop plate 174 is attached to the lower arm of bracket 120 and has upstanding projections positioned to engage casing 124 and to positively limit the extent of angular movement thereof about axis 123. The armature shaft 125 extends exteriorly of casing 124 and has a flywheel 126 secured thereto. Except as subsequently explained, the gyro sensitive element is in neutral equilibrium about all axes of freedom thereof.

A silverstat bracket 127 is shaped as clearly shown at Figures 3, 5, 6 and 10, and is provided at one end with an integral flange 128 by which it is rigidly secured to plate 119 through bolts 183 and 184. The bracket extends outwardly beneath gyro casing 124. From Figure 6, which shows bracket 127 in inverted position, it will be noted that resistance sets 33 and 34 are wound upon a pair of tubes 129 and 130 secured at their ends to flange 128.

The ends of consecutive resistance coils are brought out at the sides of the tubes and are there secured together to form taps, as indicated, for example, at 131 and 132, Figure 6. A conductor 35 or 36, as the case may be, then leads from each tap to the corresponding silverstat leaf. As shown upon Figures 3 and 5, a brace 133 is secured to bracket 127 by screws 134, and to the outer ends of tubes 129 and 130, to rigidly hold the resistance sets or units in position. This brace is omitted in Figure 6 for greater clarity of illustration.

The right and left sets of silverstat leaves are supported on the surface of bracket 127. As previously stated, each set consists of a number of resilient metallic leaves or blades separated at one end by dielectric spacers interleaved therewith, each set of leaves and spacers being rigidly clamped together and secured to bracket 127, as by clamping screws 135 threaded through upstanding lugs 136 integral with said bracket. See Figure 10. A third central lug 137 acts as an abutment and spacer for the two sets of leaves.

As best seen at Figure 5, the silverstat leaves of each set increase progressively and uniformly in length from the inside leaf outwardly. A pair of separator abutments 138 and 139 are secured by machine screws to the outer end of bracket 127. Each abutment has an inclined face 140 or 141 so positioned as to engage the outer end of each leaf and maintain it in slightly spaced or separated relation with respect to the next adjacent leaf toward the spacer 32. In this manner, the free ends of a set of leaves are readily moved into contact by spacer 32 when the latter moves toward that set, but are positively held in spaced relation when the spacer moves in the opposite direction. Thus the number of leaves brought into electrical contact, and the number of resistor coils shorted out thereby, is proportional to the movement of the spacer. As previously stated, the parts are so proportioned that, with the spacer 32 in central or normal position, that is, the position in which there is no precession of the gyroscope, a number of the inner silverstat leaves 30 and 31 are in contact. This number is shown as five. Thus, as spacer 32 moves, for example, toward set 30, the fifth and sixth leaves of set 30 will be brought into contact while the fourth and fifth leaves of set 31 will become separated. This action may continue, depending upon the rate of angular movement of the gyroscope, until, in a limiting position, all of the leaves of set 30 will be in electrical contact and all the resistors of set 33 will be shorted out, while all leaves of set 31 will be separated and all the resistors of set 34 will be cut into the circuit of lead 52 and electromagnet 26 in series relation. The action just described will be reversed for an opposite direction of movement of dielectric spacer 32. In this manner, electromagnets 25 and 26 are continuously and differentially energized and armature bar 23 and valve pins 21 and 22 are operated in a smooth, positive, and precise manner, in accordance with a net effective torque equal to the difference of the torques exerted by the two electromagnets at any given instant.

Gyro casing 124 has a central flat vertical surface to which is secured, as by screws 140, one arm of an angle bracket 141. The other arm of this bracket is slotted, as at 142 to receive spacer bolt 143. The bolt is held in adjusted position along the slot by means of clamping nuts 144 and 145 threaded thereon, in a manner obvious from inspection of Figure 3. The lower end of bolt 143 is slotted, as shown at 146 and spacer 32 is clamped in position within the slot by a screw 147 passing through aligned apertures in bolt and spacer. The spacer is thus offset a substantial distance radially of axis 123 and precession of the gyroscope in one or the other direction about said axis, operates to move the spacer and effect contact and separation of the respective sets of leaves, as previously explained.

The maximum angle of precession of the gyroscope from normal or central position and corresponding to the maximum angular rate of the gyroscope and gun encountered in practice, is limited to a few degrees in each direction. In order that the angle of precession may, in all cases, be substantially proportional to the rate of angular movement of the gyroscope and gun, as a unit, in elevation and depression, constraining means are provided. Referring to Figures 3, 5 and 7, a bi-metallic strip 148 has one end fixed to casing 124. This may conveniently be done by providing spaced holes in the strip, through which screws 140 may pass to clamp the strip between casing 124 and bracket 141. The strip extends vertically upward and has a block 149 fixed to its upper end by means of screws 150. This block has a clamping strip 151 secured to its under side, as by screws 152. One end of a piece of piano wire 153 is clamped between block 149 and strip 151. The other end of wire 153 is clamped to bellows arm 154 by means of a clamping strip 155, held in position by screws 156.

A base block 157 is fixed to plate 119 in a position above bracket 120, and has an integral projection 158 at one end projecting outwardly from said plate. A leaf spring 159 has one end secured to projection 158, as by screws 160, while its other end is riveted at 161 to the adjacent end of arm 154. Since wire 153 is offset from axis 123 along the spin axis of the gyroscope, and acts both in tension and compression, precession of the gyroscope about the aforesaid axis moves arm 154 against the yielding restraint offered by spring 159. The parts are so related that wire 153 is under no stress when spacer 32 is in its normal position, that is, when the gyroscope is undeflected. This relation can be initially attained merely by loosening clamp screws 152 or 156, moving the gyroscope about axis 123 until the same number of silverstat leaves of the two sets, are in contact, then tightening the screws. The bi-metallic strip acts to compensate for changes in the initial position of spacer 32 that would otherwise by caused by expansion and contraction of the fluid in the damping bellows, as will be subsequently explained.

A bellows or "Sylphon" element 162 has one end sealed and provided with a stud 163, threaded into an aperture in arm 154 adjacent wire 153. The other end of the bellows has a nipple 164 (Figure 7) threaded into an aperture in base block 157, and acting to place the interior of the aforesaid bellows in communication with a bore 165 in the block. A needle valve 166 threadedly engages block 157 and is axially translated, upon rotation, to vary the effective area of a tapered constriction 167 in bore 165. The end of bore 165 is closed by plug 168.

A second bellows or "Sylphon" 169, of somewhat larger size than 162 has its outer end sealed and a nipple 170 at its other end threaded into block 157 to place the interior of the bellows in communication with the constricted portion of bore 165. The two bellows are filled with a fluid such as light oil and the maximum possible rate of flow of oil from one bellows to the other is determined by the adjustment of valve 166. Thus, as the gyroscope precesses to move wire 153 to the left, as viewed upon Figure 7, bellows 162 is compressed and oil flows therefrom into bellows 169 to extend the latter. Likewise, when wire 153 moves to the right, bellows 162 is extended and oil flows from 169 as the latter contracts. In both cases, the rate of flow for normal operating temperature of the oil, is so adjusted and correlated with the moment of inertia and speed of rotation of the gyroscope rotor, that the angle of precession about axis 123, is proportional to the rate of angular movement of the gyroscope relatively to the gun, about the axis of shaft 93, or of the gyroscope and gun as a unit, about the axis of trunnions 71. When the aforesaid angular motion ceases, the resilience of spring 159 aided to a certain extent by the resilience of "silverstat" leaves 30 and 31, acts to restore the gyroscope to normal or centralized position wherein an equal number of "silverstat" leaves of the two sets, are in electrical contact. A shield 171 surrounds bellows 169 and is supported at one end by block 157.

Referring to Figure 5, a lead is seen to extend from one pole of a receptacle 175 to a capacitor 176 mounted in a clip 177 on plate 119. Lead 43 extends from capacitor 176 to rheostat 44. The circuit then proceeds by lead 45 to the common terminal 46 of the resistance sets 33 and 34, as previously traced in connection with Figure 1. Current is supplied to the gyroscope motor over pig-tail leads 65 and 65'. These, as well as a number of other unimportant details, have been omitted from Figure 3 to avoid confusion. All parts mounted upon plate 119 are enclosed by a cover 178 held in position by nuts threaded upon studs 179 and 180 fixed in plate 119. See Figure 5.

The mounting of the gyroscope is an essential and important part of the invention and we desire to stress the fact that the axis 182 of shaft 93, precession axis 123 and spin axis 181 are concurrent. Axes 123 and 182 are at all times mutually perpendicular, as are axes 123 and 181. In the normal or centralized position of the gyroscope, axis 181 is normal to axis 182, as shown in Figure 3. The sensitive element of the gyroscope, that is casing 124 and all parts mounted thereon, is in neutral equilibrium about all of the aforesaid axes, except only for bracket 141 and the parts carried thereby, plus strip 148, block 149 and strip 151. That is, with these parts removed, as by removal of screws 140, the sensitive element is in exact neutral equilibrium. Attachment of bracket 141, strip 148, etc., acts to offset the center of gravity of the element to the right as seen in Figure 3, along the axis 182. While the weight of parts 141 to 152, is sufficient in the model selected for illustration, it will be understood that additional masses may be attached to casing 124, if it is desired or found necessary, for any reason, to further offset the center of gravity along axis 182. When the gyroscope is in the position shown in Figure 3, and axes 182 and 181 are horizontal so that axis 123 is vertical, the moment exerted by the offset of the center of gravity has no component about axis 123 but lies solely in the vertical plane determined by concurrent axes 123 and 182. However, when axis 123 moves from a vertical position, as by tilting of the tank or ship about axis 182, the moment exerted by the aforesaid offset of the center of gravity, has a component about axis 123 proportional to the sine of the angle of tilt of said axis from the vertical. In short the parts 32 and 141 to 152, perform the dual function (a) of controlling the gyroscope and (b) of offsetting the center of gravity. Since the gyroscope is fixed relatively to arm 90 about axis 182 except when worm 104 is turned, the component torque about axis 123 cannot effect precession and acts directly, to slowly rotate the gyroscope about axis 123. By proper selection of the direction of spin and coordination of the sets of "silverstat" leaves with electromagnets 25 and 26, the aforesaid rotation about axis 123 acts upon "silverstat" leaf sets 30 and 31 in the manner necessary to move the gun and gyroscope as a unit to eliminate or take out the aforesaid tilt. This direction of rotation is, as indicated by the arrows upon Figures 3 and 5.

For clarity of explanation, the gyroscope spin axis has been described as normally horizontal. This position is preferable but not essential. The spin axis may, in normal, or position of no precession, have any angular relation with respect to the horizontal. It is necessary only, that the aforesaid angular relation have a definite and predetermined value, and that bracket 141 be so related to the "silverstat" that electromagnets 25 and 26 are equally energized or exert equal moments on bar 23, when the gyroscope is in normal position, while the offset center of gravity must be so related to the gyroscope as to apply a torque thereto only when the spin axis departs from the aforesaid normal angular relation.

Operation

Assume that the gun and stabilizer system are mounted within and carried by the turret of a tank moving over level terrain and that the gun is initially horizontal, that is, at zero degrees elevation. A target is selected by the tank commander. The angle of gun elevation necessary to engage the target is determined and transmitted to one of the gunners who thereupon operates hand wheel 109 to rotate gear 96, plate 119 and the stabilizer parts carried thereby, about axis 182. The direction of rotation will be such as to effect clockwise rotation of shaft 93 as received from the right, Figure 3. This rotation applies to a torque tending to change the direction of the spin axis 181. Hence the gyroscope precesses counterclockwise looking down along axis 123, Figure 3, and moves spacer 32 to close additional silverstat leaves of set 30 and to open a corresponding number of leaves of set 31. Furthermore, the angle of precession and, hence, the number of leaves of set 30 that are closed, and of set 31 opened, will be proportional to the rate at which gear 96 and the parts attached thereto, are rotated.

The aforesaid actuation of the "silverstat" then shorts out a number of the resistances of set 33 and cuts in a number of those of set 34. This acts to increase the pull exerted by electromagnet 25 and to decrease that exerted by electromagnet 26. As a result, bar 23 is tilted to decrease the restriction of valve opening 18 and to increase that of 19. Pressure builds up in line 14 and decreases in line 13 and the piston in cylinder 4, Figure 1, or 80, Figure 2, is moved to elevate the gun as long as the handwheel 109 is rotated. The rate of gun movement is substantially proportional to the angle of precession and, hence, to the rate of turning of handwheel 109. Turning is continued until the proper elevation is indicated upon the gun quadrant, not shown. Should it be required to decrease the angle of gun elevation at any time, it is merely necessary to reverse the direction of rotation of handwheel 109, whereupon, gyroscope 124 precesses in the opposite direction from that just described, and closes additional leaves of set 31, while opening a corresponding number of set 30.

Suppose, now, that the vehicle encounters rough terrain such that it tilted downwardly, thus tending to decrease the angle of gun elevation with relation to the true horizontal plane. The effect upon the gyroscope is exactly the same as that caused by an equal clockwise angular movement of shaft 93 as previously described. An increased number of leaves of set 30 are thus closed and a corresponding number of leaves of set 31 are opened so that the gun is elevated relatively to the tank, to maintain substantially constant its angle of elevation relatively to the true horizontal plane. The reverse operation takes place should the vehicle encounter terrain causing it to tilt upwardly.

The two actions have been described separately merely for clarity. However, the elevation of the gun relatively to the true horizontal plane may be changed while the vehicle is moving over uneven terrain. In all cases, the effect upon the gyroscope is the algebraic sum of the rates of angular movement applied about axis 182 by operation of handwheel 109 and pitching of the tank. Hence the angle of elevation may be changed at any time and the gyroscope will act to stabilize the gun at the elevation extant when motion of the handwheel ceases.

The spin axis 181 may depart from the predetermined normal position, shown as horizontal in Figure 2, as by reason of angular movement about axis 182 at a rate two low to cause precession. In such cases, as soon as the aforesaid departure becomes appreciable, the offset center of gravity along axis 182 applies a component torque about axis 123 which, as previously stated, is proportional to the sine of the angle of departure. For example, suppose the departure should be such as to depress the gun muzzle and decrease the desired angle of elevation. The masses 141 to 152, inclusive, then act to move the gyroscope counterclockwise about axis 123 as seen looking down along said axis in Figure 3. This closes one or more additional leaves of set 30 and, in the manner described, acts to elevate the gun and gyroscope. The action will continue until the gyroscope is restored to normal postion, no matter in which direction the departure takes place. Obviously, the same result can be effected by reversing the direction of spin of the gyroscope, interchanging the connections from the silverstat leaf sets to electromagnets 25 and 26, and placing a weight on the casing 24 to offset the center of gravity along axis 182 in the direction opposite to that described, that is, to a position to the left of axis 123, as viewed upon Figure 3.

It will thus be seen that we have invented a combined gun elevating and stabilizing system that is relatively simple, extremely rapid in response, and accurate in operation, and that uses a single rate responsive gyroscope which is automatically centralized or restored to neutral position upon wandering from said position. The elevation may be changed concurrently with the stabilizing action and, because of the facts that electromagnets are continuously energized and that hydraulic pressures are continuously maintained upon opposite sides of piston 7, the response of the system is practically instantaneous. Furthermore, turning or yawing of the vehicle can apply no ballistic pressures to the gyroscope and are substantially ineffective to deflect the same. Furthermore, because of the relatively low rate of acceleration of such vehicles, the gyroscope is substantially unaffected thereby even when the gun is pointed directly forwardly or rearwardly. Finally, the gyroscope is self-centralizing and acts to effectively stabilize the gun in elevation for all angles of elevation and with a precision substantially unaffected by speed of the vehicle or the nature of the terrain over which it is traveling. The stabilizing system has been disclosed in connection with a gun and its mount. However, it will be appreciated that the system is of general utility in connection with any object pivoted upon an unstable platform where it is desired to stabilize such object relatively to space external of said platform. Sighting instruments, range finders, sound locators, radar equipment, are among the many objects that may be usefully stabilized by our invention.

While we have disclosed a preferred form of our invention, it will be clear that numerous changes, modifications and substitutions may be made without altering the basic principles upon which the invention relies for operation. A number of these modifications have been discussed. Others will be obvious to those skilled in the art. Hence the foregoing disclosure should be taken in an illustrative, rather than a limiting sense and we desire to reserve all such changes, alteration, substitutions of equivalents, and modifications, as fall within the scope of the subjoined claims.

This application is a continuation in part of our copending prior application Serial Number 476,296, filed February 18, 1943.

Having now fully disclosed the invention, what we claim and desire to secure by Letters Patent is:

1. In stabilizing apparatus for maintaining a pivotally-mounted gun in a predetermined direction angularly about its mounting axis and wherein power means is arranged to apply forces to the gun about the mounting axis, a gyro including a support, a frame or casing pivotally carried by the support about a precession axis, and a rotor journaled in the frame or casing; means for mounting the support for angular movement with the gun as the latter moves about its mounting axis with the precession axis normal both to the axis of angular movement of the support and to the rotor spin axis and with the latter axis extending transversely of the axis of angular movement of the support so that angular velocity of the latter about its axis of angular movement is accomplished by proportional torque of the gyro about the precession axis; means for opposing motion of the gyro about the precession axis so that movement thereof about such axis due to said torque is in response to angular velocity of the support about its mounting axis; a control device for the power means and including an actuated member and an actuating member movable from mid-position relative to the actuated member to control the direction and magnitude of force applied by the power means to gun; an element fixedly mounted upon the support and upon which the actuated member is rigidly mounted for operation by and in response to precession of said gyro rotor; means for connecting said actuating member to the gyro frame or casing so that it is in eccentric relation to the precession axis to cause movement of said actuating member relatively to said actuated member by and in response to precession of said gyroscope; and a mass fixed to said gyroscope in eccentric relation to said precession axis whereby said mass applies a component torque about said axis when the gun deviates from its predetermined direction about the mounting axis to effect relative movement of the actuating and actuated members for control of the power means to move the gun for restoration of the gun to its predetermined direction.

2. A stabilizer comprising a support pivotally mounted on a horizontal axis, a gyroscope carried by said support and having a gimbal frame on a vertical precession axis and a flywheel on a horizontal spinning axis, a resistor carried rigidly by said support and including spaced contactor blades, an actuator carried by said gimbal frame and extending to a position adjacent to said blades and adapted to engage said blades on precession of the gyroscope, and a mass attached to said gimbal frame laterally of the plane of said precession and spinning axes.

3. A stabilizer comprising a support mounted on a horizontal axis, a gyroscope carried by said support and having a gimbal frame on a vertical precession axis and a flywheel on a horizontal spinning axis, a pair of resistors carried rigidly by said support and including horizontally spaced contactor blades, an actuator carried by said gimbal frame and extending into the space between said blades, said actuator being positioned to engage one or the other of said resistors on precession of the gyroscope, and a mass attached to said gimbal frame laterally of the plane of said precession and spinning axes.

4. A stabilizer comprising a support pivotally mounted on a horizontal axis, a gyroscope carried by said support and having a gimbal frame on a vertical precession axis and a flywheel on a horizontal spinning axis, a resistor carried rigidly by said support and including horizontally spaced contactor blades, a mass attached to said gimbal frame laterally of the plane of said precession and spinning axes, and an actuator carried by said mass and extending to a position adjacent to said blades and adapted to engage said blades on precession of the gyroscope.

5. In a stabilizing and elevating system of the class wherein power means are operatively connected with a gun mounted upon an unstable platform, to pivotally move the gun about a normally horizontal first axis in fixed relation with the platform, a gyroscope carried by the gun and having mutually perpendicular spin and precession axes lying normally in a predetermined position with respect to the vertical in a first plane perpendicular to said first axis, base means mounting said gyroscope on the gun for adjustment relatively thereto about a second axis parallel to said first axis, control means carried by said base means in fixed relation therewith, said control means being responsive to the angle of precession of said gyroscope and effective to control the direction and rate of movement of the power means in accordance with and in direct proportion to the direction and angle of precession of said gyroscope, said gyroscope having its center of gravity offset from said first plane along said second axis to thereby effect a component torque rotating said gyroscope about said precession axis when the gun changes its set elevation, said rotation effecting operation of said control means to restore the set elevation of the gun.

JEFF S. RHYNE.
RICHARD E. HOLMES.

REFERENCES CITED

The following references are of record in the file of this patent:

UNITED STATES PATENTS

| Number | Name | Date |
|---|---|---|
| 1,232,619 | Sperry | July 10, 1917 |
| 1,801,947 | Boykow | Apr. 21, 1931 |
| 2,381,161 | Lynn | Aug. 7, 1945 |
| 2,391,965 | Hanna et al. | Jan. 1, 1946 |
| 2,404,172 | Hanna | July 16, 1946 |